(12) United States Patent
Gibbs et al.

(10) Patent No.: US 6,315,105 B1
(45) Date of Patent: Nov. 13, 2001

(54) CONVEYOR BELT SCRAPING APPARATUS

(75) Inventors: A. Todd Gibbs, Allentown; George T. Mott, Alburtis, both of PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 09/393,099

(22) Filed: Sep. 9, 1999

Related U.S. Application Data
(60) Provisional application No. 60/140,398, filed on Jun. 22, 1999.

(51) Int. Cl.$^7$ ............................ B65G 45/00; B65G 45/12; B65G 45/16
(52) U.S. Cl. ........................................... 198/497; 198/499
(58) Field of Search ..................................... 198/497, 499

(56) References Cited

U.S. PATENT DOCUMENTS

| | | |
|---|---|---|
| 4,489,823 | 12/1984 | Gordon . |
| 4,533,035 | 8/1985 | Reiter . |
| 4,533,036 | 8/1985 | Gordon . |
| 4,633,999 | 1/1987 | Perneczky . |
| 4,658,949 | 4/1987 | Reicks . |
| 4,696,388 | 9/1987 | Stoll . |
| 4,768,644 | 9/1988 | Romm . |
| 4,825,997 | 5/1989 | Bowman et al. . |
| 4,917,231 | 4/1990 | Swinderman . |
| 5,007,523 | 4/1991 | Morefield . |
| 5,016,746 | 5/1991 | Gibbs . |
| 5,161,669 | 11/1992 | Gibson, Jr. . |
| 5,197,587 * | 3/1993 | Malmberg ..................... 198/497 X |
| 5,201,402 | 4/1993 | Mott . |
| 5,222,589 | 6/1993 | Gordon . |
| 5,413,208 | 5/1995 | Veenhof . |
| 5,573,102 * | 11/1996 | Puchalla ........................ 198/497 X |
| 5,692,595 | 12/1997 | Gilbert . |
| 5,797,477 | 8/1998 | Veenhof . |
| 5,865,294 | 2/1999 | Betz . |
| 5,944,167 * | 8/1999 | Brink ............................. 198/497 X |
| 6,056,112 * | 5/2000 | Wiggins ......................... 198/499 X |
| 6,082,524 * | 7/2000 | Brink ............................. 198/499 X |

FOREIGN PATENT DOCUMENTS
0 338 118    10/1989    (EP) .

OTHER PUBLICATIONS
Martin Engineering, Martin XHD Durt Tracker Belt Cleaner and Tensions, Operator's Manual, Dec. 1998, 50 Pages, Neponset, IL.
Martin Engineering, Martin QC #1 Belt Cleaner, Operator's Manual, 1998–2000, 26 Pages, Neponset, IL.

* cited by examiner

*Primary Examiner*—Christopher P. Ellis
*Assistant Examiner*—Gene O. Crawford
(74) *Attorney, Agent, or Firm*—Dann, Dorfman, Herrell and Skillman, P.C.

(57) ABSTRACT

A conveyor belt scraping apparatus comprises a blade having a blade edge biased against a conveyor belt. The blade is supported at its base and has a web extending from the base to support the blade edge. The web has at least one groove therein substantially parallel to the blade edge to define a tensioning region at the narrowed region of the web, whereby the blade may be biased and tensioned without need for external biasing and tensioning arrangements. Preferably, there are plural grooves in the web. Also preferably, the plural grooves are of different sizes so as to provide a progressive rate to the spring characteristic of the tensioning region of the web. In addition, a groove may have a cushioning material therein so as to provide cushioning of the blade.

24 Claims, 8 Drawing Sheets

CONVEYOR BELT SCRAPING APPARATUS

This Application claims the benefit of U.S. Provisional Application Serial No. 60/140,398 filed Jun. 22, 1999.

The present invention relates to conveyors and, in particular, to scraping apparatus for a conveyor.

Conveyors are widely used to quickly and efficiently move objects and material from one location to another. A conveyor includes a continuous loop conveyor belt that is looped over a rotatable head pulley and a rotatable tail pulley. The head pulley is powered to rotate in a direction that pulls the portion of the conveyor belt that is between the tops of the head and tail pulleys toward the head pulley to convey material to that location. The lower portion of the conveyor belt is slack and moves from the head pulley towards the tail pulley. Objects and material may be loaded onto the conveyor belt at any location or locations along the top portion thereof and are unloaded or discharged at the location of the head pulley as the conveyor belt moves downward as it travels around the head pulley. Where the belt is long or the load heavy, the belt is supported intermediate the head and tail pulleys on rollers, slider bars and other conventional support arrangements.

The efficiency of the conveyor depends upon completely discharging the load at the head pulley. Although some loads discharge simply by falling off the conveyor belt under the influence of gravity as the belt travels around the head pulley, other loads, such as loads including wet and/or sticky materials, tend to adhere to the conveyor belt and so would be carried along with the belt as it returns toward the tail pulley.

Discharge efficiency is improved by employing a scraper at the head pulley to bear against the conveyor belt as it travels around the head pulley so as to scrape material and deposits off of the conveyor belt to clean the belt, which material would otherwise adhere to the surface of the conveyor belt.

A common type of scraper assembly comprises a blade positioned transverse to the direction of belt travel or movement and bearing against the belt where it travels around the head pulley. A mounting tube supporting the blade via mounting brackets to nearby structure includes a tensioning system to bias the blade against the belt. Conventional mounting and tensioning arrangements employ tubes, bars, rods, levers, bearings and the like to allow movement and tensioning of the blade and springs and like arrangements to tension the blade against the conveyor belt. Additional complexity is often required to provide cushioning of the blade against irregularities in the conveyor belt All of these arrangements are susceptible to malfunction, wear, corrosion and stress as a result of the rigors of use, not the least of which are the effects of the dirt and grit that are ever present in many applications, for example, mining and quarrying. The need to clean and repair such conventional arrangements imposes additional costs and requires additional labor, and may even require the stopping of the conveyor, thereby causing the loss of production. This is in addition to the necessary periodic replacement of the scraper blade which necessarily wears with use.

Accordingly, there is a need for a scraping apparatus that avoids the many of the problems of conventional scrapers and desirably incorporates a tensioning and cushioning arrangement into the replaceable scraper blade.

To this end, the scraping blade according to the present invention comprises a blade base, and an elastomeric blade web extending from the blade base and having a blade edge on the blade web distal the blade base. The blade web has at least one groove therein substantially parallel to the blade edge for imparting flexibility to the blade web in a region proximate the at least one groove.

According to a further aspect of the present invention, apparatus for scraping a belt comprises a scraping blade and a blade mount assembly. The scraping blade comprises a blade base adapted to engage a blade mount, a blade web extending from the blade base and having a forward side and a rearward side, the forward side having a blade edge substantially parallel to the blade base for engaging the belt, and the blade web having a plurality of grooves on the rearward side thereof substantially parallel to each other and to the blade base. The blade mount assembly comprises a blade mount engaging the blade base, and a rotatable mount rotatably supporting the blade mount, the rotatable mount being lockable in a plurality of rotation positions for urging the blade edge of the scraping blade against the belt.

BRIEF DESCRIPTION OF THE DRAWING

The detailed description of the preferred embodiments of the present invention will be more easily and better understood when read in conjunction with the FIGURES of the Drawing which include.

DESCRIPTION OF THE PREFERRED EMBODIMENT

Figure 1:
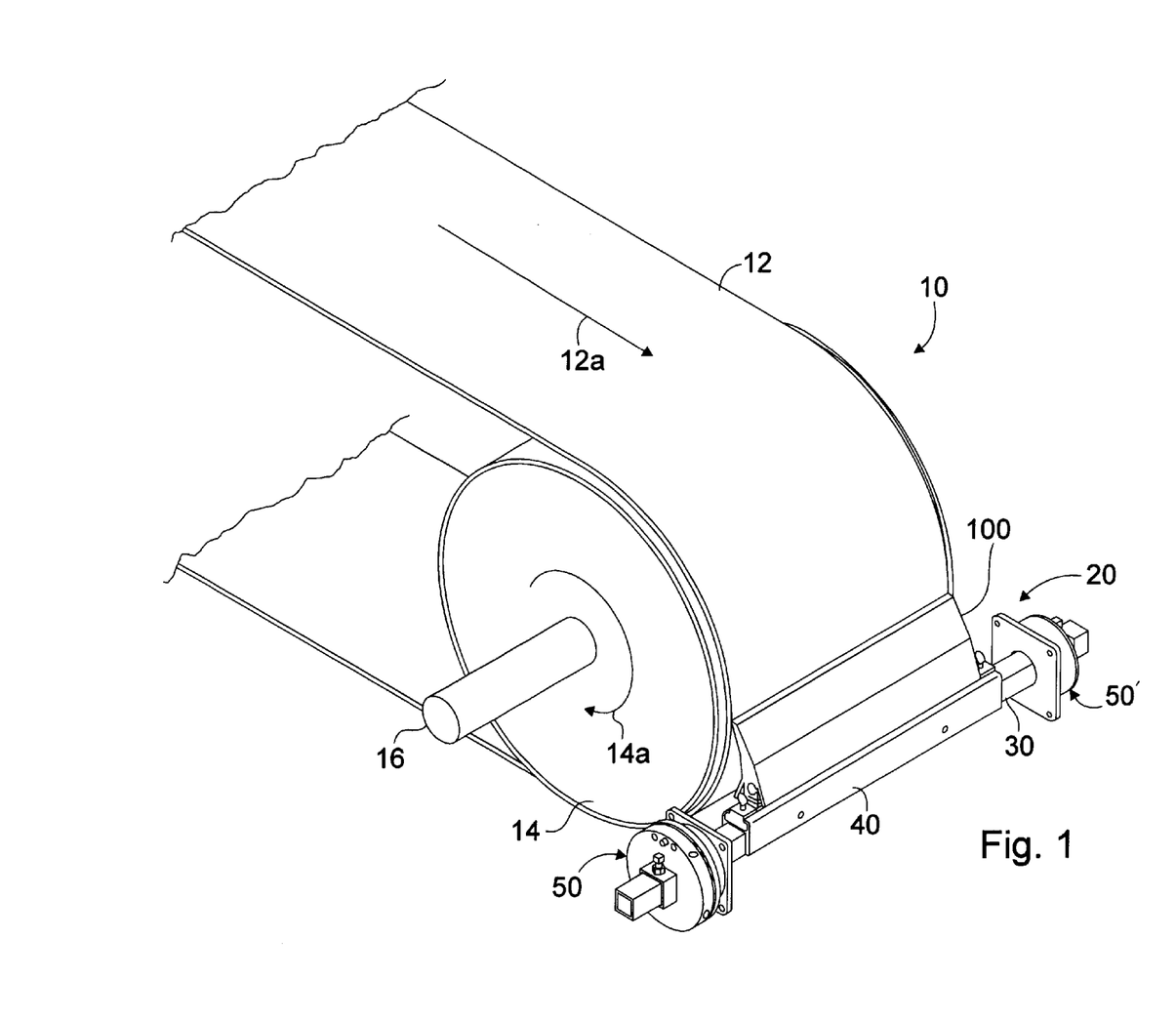
FIG. 1 is an isometric view of an exemplary embodiment of a belt scraper assembly arrangement positioned against a belt at a head pulley of a conveyor belt system, including the present invention.

In a conveyor system 10 of FIG. 1, a conveyor belt 12 runs around a head pulley 14 at one end of the conveyor and a tail pulley (not shown) at the other end of the conveyor, and is supported intermediate the head pulley 14 and tail pulley by arrangements of support rollers, slider bars and the like. Head pulley 12 is rotatably mounted on axle 16 and is powered for rotation in the direction shown by arrow 14A thereby to move belt 12 in the direction shown by arrow 12A. Material to be conveyed is deposited onto the top of belt 12 at one or more locations along its length, is conveyed on belt 12 in the direction of travel of the top of belt 12, and is deposited by belt 12 as it passes or travels around head pulley 14 and the conveyed material falls off of belt 12 into a receptacle or other receiving arrangement.

Depending on the consistency and stickiness of the conveyed material and the extent to which it adheres to the belt 12, more or less of the material will be deposited in the desired location, i.e. into the receptacle. To increase the efficiency of the conveyor 10 and the amount of the conveyed material deposited into the receptacle, a scraper blade 100 is arranged in a belt scraper assembly 20 to bear against belt 12 as it passes over and travels around head pulley 14, as is illustrated in FIG. 1. A belt scraper positioned against a head pulley is usually referred to as a "primary cleaner."

Figure 1A:
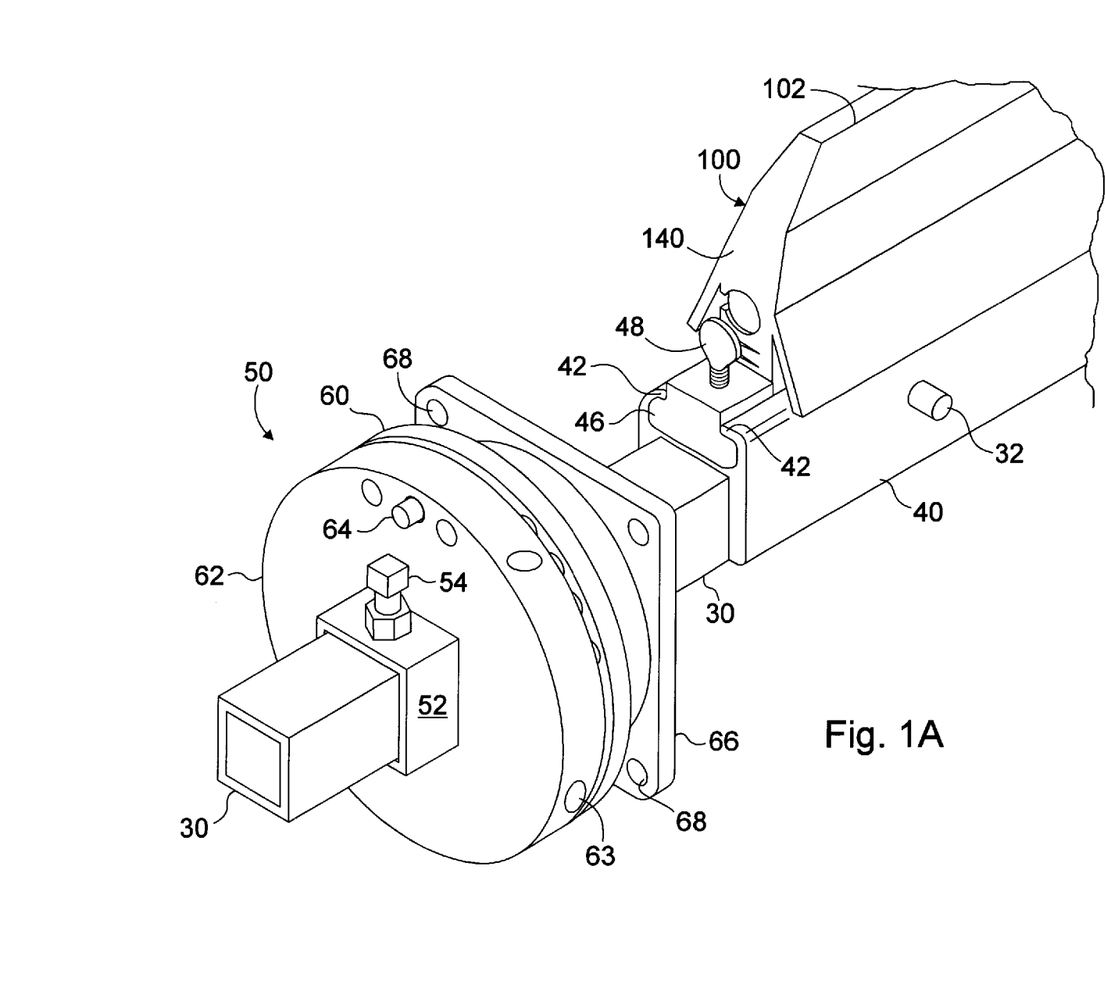
FIG. 1A is an enlarged isometric view of a portion of the belt scraper assembly of FIG. 1 showing the mounting arrangement thereof.

Blade 100 is secured in blade base extrusion 40 by tightening thumb screws 48 of blade locks 46, thereby preventing blade 100 from sliding in base extrusion 40. Blade base extrusion 40 is secured to mounting tube 30, for example by one or more blade base attachment pins 32, to prevent relative movement between blade base extrusion 40 and mounting tube 30. Mounting tube 30 is non-circular in cross-section, for example, is rectangular or square as shown, and is positioned in relation to conveyor belt 12 and head pulley 14 by mounting tube supports 50, 50'.

Mounting tube 30 is secured in mounting tube supports 50, 50' with respect to outer adjustment collar 62, for example, by locking collar 52 which is secured by set screw or locking bolt 54. Mounting bracket 66, which is preferably part of mounting locking bracket 60, is fastened, such as by bolts (not shown) through mounting holes 68 therein, to structure or a base that is essentially fixed with respect to head pulley 14. The tension applied to blade 100, i.e. the force with which the scraping edge 102 of blade 100 is pressed against belt 12, is adjusted by rotating mounting tube 30 and adjustment collar 62 with respect to mounting locking bracket 60 and inserting lock pin 64 through the aligned corresponding locking holes of mounting locking bracket 60 and adjustment collar 62.

Figure 2:
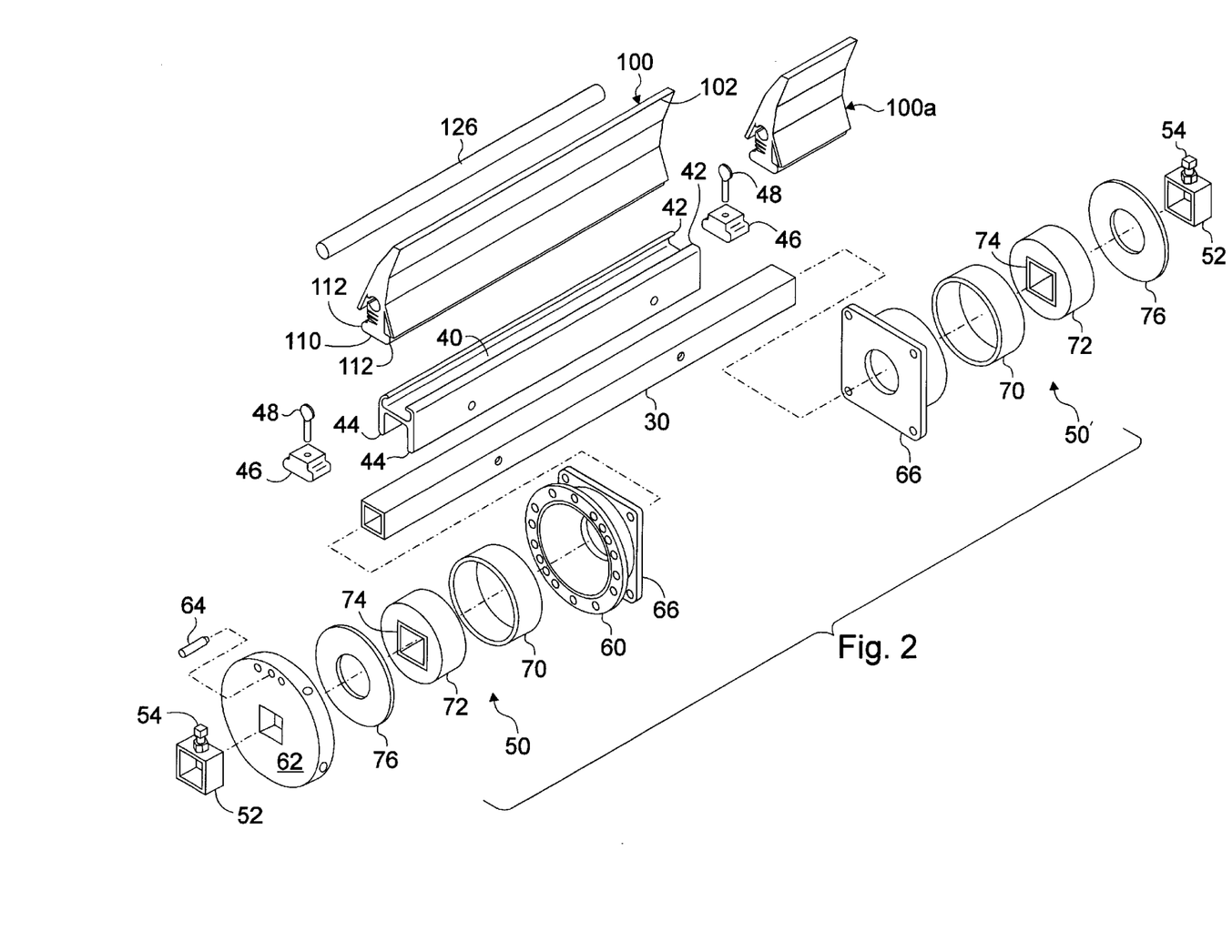
FIG. 2 is an exploded isometric assembly view of the belt scraper assembly of FIG. 1.

As is best seen in the exploded view of FIG. 2, blade 100 has a blade base 110 distal its scraping edge 102 that is secured in blade base extrusion 40. Blade base 110 of blade 100 is secured in blade base extrusion 40 by tightening thumb screws 48 of blade locks 46, thereby preventing blade base 110 from sliding in base extrusion 40. A pair of opposed inwardly extending longitudinal flanges 42 of blade base extrusion 40 define a pair of opposed inwardly facing longitudinal grooves that receive a pair of outwardly extending mounting flanges 112 at the blade base 110 of blade 100 and like pairs of flanges of blade locks 46. The mating engagement of the flanges 112 of blade base 110 and the grooves of blade base extrusion 40 defined by flanges 42 fix the position of blade 100 with respect to blade base extrusion 40. Flanges 44 of extrusion 40 engage mounting tube 30 to which blade base extrusion 40 is pinned by pins 32, longitudinally and also particularly with respect to rotation of mounting tube 30 about its longitudinal axis. Blade locks 46 secured by thumb screws 48 fix the position of blade 100 longitudinally with respect to mounting tube 30, i.e. transversely with respect to conveyor belt 12. Thus, the position of blade 100 with respect to conveyor belt 12 and head pulley 14 is determined.

The arrangements of mounting tube supports 50 and 50' for the respective ends of mounting tube 30 are similar except that support 50 includes a rotationally adjustable collar 62 for setting the tension of blade 100 against conveyor belt 12. Mounting brackets 66 and 66' are each attached to conveyor belt system 10 structure or some other base that is generally fixed in position with respect to head pulley 14. At each end of mounting tube 30, a mounting bearing 70, a shock mount 72, a spacer 76 and a mounting tube collar 52 cooperate to support mounting tube 30,and blade 100 thereon, with mounting tube 30 being rotatable with respect to its longitudinal axis and substantially fixed longitudinally. Preferably, one end, but possibly both ends, of mounting tube 30 are supported in a locking type mounting bracket 60 that cooperates with an outer adjustment collar 62 for adjusting the tension on blade 100.

Each of mounting locking bracket 60 and adjustment collar 62 have a plurality of holes located on an arc or a circle of like radius so that, when desired blade tension is applied by rotating mounting tube 30, the tension is maintained by inserting lock pin 64 into the aligned corresponding holes of mounting locking bracket 60 and adjustment collar 62. Mounting tube 30 is rotated to apply tension by forcing blade edge 102 against belt 12 and deforming web 140 of blade 100, as can be obtained by a wrench engaging mounting tube 30 or a lever arm inserted into hole 63 of collar 62. Further details of the locking hole arrangement are set forth in U.S. Pat. No. 5,201,402 entitled "Scraper Blade Tensioning Device" issued Apr. 13, 1993 to George T. Mott, which is hereby incorporated herein by reference in its entirety.

Among the advantages of the foregoing mounting arrangement are that blade 100 is easily and conveniently replaceable. Replacement of blade 100 is accomplished by releasing the tension maintained by mounting locking bracket 60, removing locking pin 64, relaxing the tension, removing pins 32 to release extrusion 40 from mounting tube 30, and lifting blade 100 and extrusion 40 off mounting tube 30. Blade 100 is removed from extrusion 40 by loosening thumb screw 48, and then sliding blade lock 46 and blade base 110 out of extrusion 40, thereby freeing base 110 of blade 100 to slide out of extrusion 40. Installation of blade 100 is accomplished by reversing the foregoing steps. Where blade 100 is comprised of a plurality of blade segments 100A, if clearance is sufficient, blade segments 100A may be replaceable by removing blade lock 46 without removing extrusion 40.

Blade 100 has at least one groove 120, 130, 132, 134 therein extending in a side-to-side direction, i.e. in a direction generally parallel to scraping edge 102 and blade base 110, and transverse to conveyor belt 12, for allowing movement of scraping edge 102 of blade 100 with respect to blade base 110 thereof. Preferably, blade 100 has a plurality of grooves 120, 130, 132, 134. A cushioning member such as cushioning rod 126 may be positioned in such groove, such as in groove 120 in blade 100, for providing a cushioning effect when scraping edge 102 of blade 100 moves with respect to blade base 110 thereof, for example, as a result of encountering an irregularity in belt 12. While blade 100 may be a unitary blade structure, it may also be comprised of plural blade segments 100A, as may be convenient, for example, where conveyor belt 12 is wide.

Figure 3:
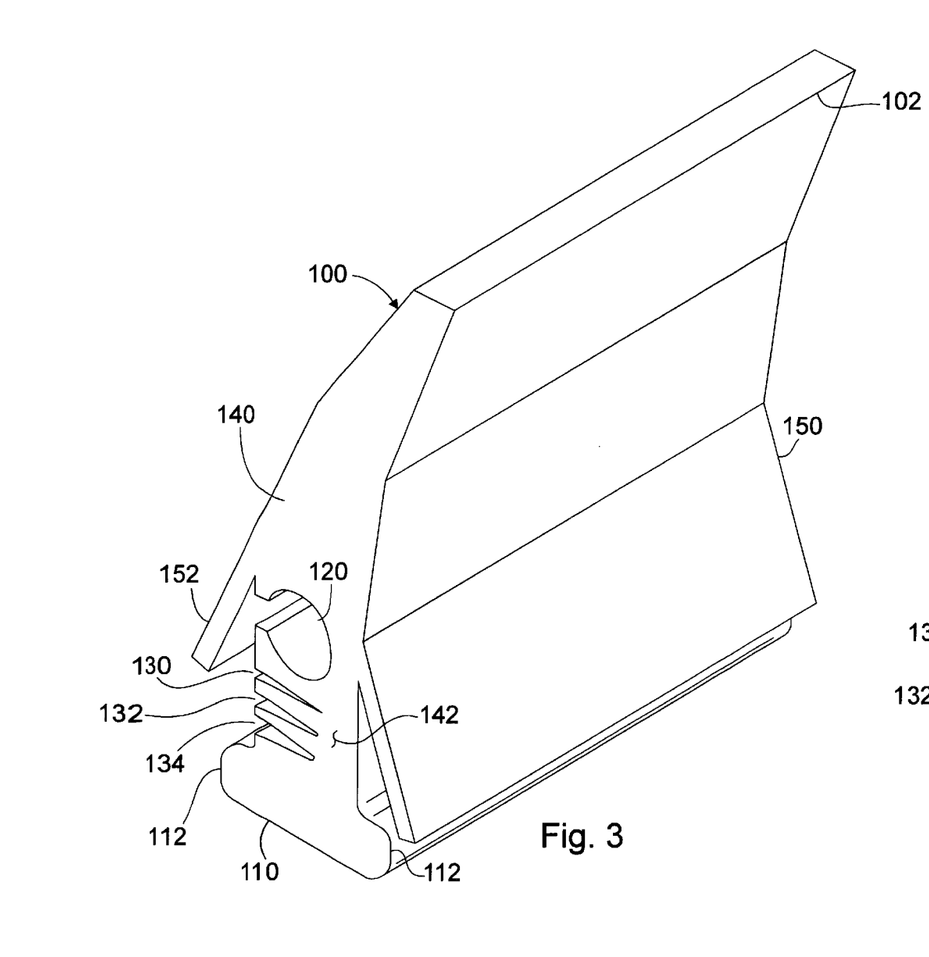
FIG. 3 is an isometric view of the blade of the belt scraper assembly of FIG. 1.

FIG. 3 is an isometric view of a preferred embodiment of blade 100. Scraping edge 102 is distal from blade base 110 and is generally substantially parallel thereto and has a length that is substantially the same as the width of blade 100. Extending from blade base 110 and the outwardly extending flanges 112 thereof is a web section 140 of blade 100 that includes at least one groove 120, 130, 132 or 134,.and preferably a plurality of grooves 120, 130, 132, 134 that are generally substantially parallel to scraping edge 102 and blade base 110. The web 140 of blade 100 extends beyond a tension region 142 and includes at the distal end thereof scraping edge 102. Grooves 120, 130, 132, and/or 134 define tension region 142 of blade 100 that is generally thinner than is the remainder of the web 140 of blade 100, so as to flex to allow movement of scraping edge 102 with respect to blade base 110. Grooves 120, 130, 132, 134 are preferably on the side of web 140 opposing the side thereof including blade edge 102, i.e. on the side of web 140 facing away from belt 12.

Preferably, blade 100 also includes dirt skirts 150 and 152 extending outwardly from the web 140 of blade 100 and sloping away from scraping edge 102 so as to deflect material scraped from conveyor belt 12 and other debris away from grooves 120, 130, 132, 134 and blade base 110.

It is noted that groove 120 is preferably a cushion cavity 120 of generally circular cross-section 122, has an opening through the web 140 of blade 100 that is generally in the shape of a slot 124, and has a cushion rod 126 therein that substantially fills cushion cavity 120. Cushion rod 126 may be a rod of cushioning material that is inserted into cushion groove 120 or may be molded or cast into cushion groove 120. Grooves 130, 132, 134 are generally "V" shaped, and may be of different sizes and depths, as is described below.

Thus, blade 100 according to the present invention incorporates a tensioning arrangement and a cushioning arrangement into the geometry of the scraper blade 100 so that, in effect, every time blade 100 is replaced, the blade tensioning arrangement is also replaced at no additional effort or cost. This advantageously eliminates the complexity and cost of conventional blade tensioning arrangements, and the substantial effort and cost of the necessary cleaning, maintenance and repair thereof.

Figure 4:
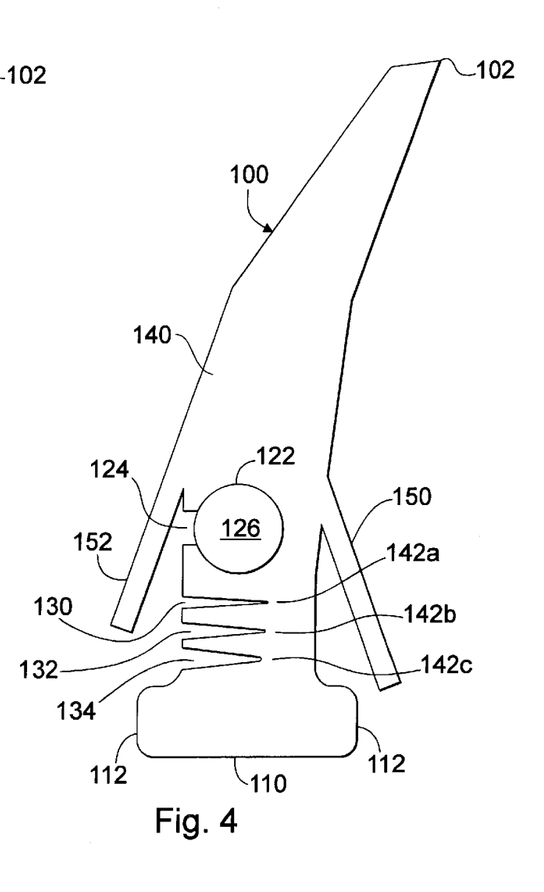
FIG. 4 is a side elevation of the blade of FIG. 3.

In the preferred arrangement of blade 100 illustrated in FIG. 4, V-grooves 130, 132, and 134 are of different sizes and depths. Specifically, groove 134 is wider than groove 132 which is wider than groove 130, and groove 130 is deeper than groove 132 which is deeper than groove 134. Thus, the thickness of web 140 in tension region 142 is non-uniform so that tension region 142A is more flexible than is tension region 142B, and tension region 142B is more flexible than is tension region 142C. As a result of the non-uniform thickness of tension region 142, tension regions 142A, 142B and 142C thereby cooperate to define a three-stage progressive spring that has a non-uniform or non-linear or progressive "rate" or spring constant.

Figure 5A:
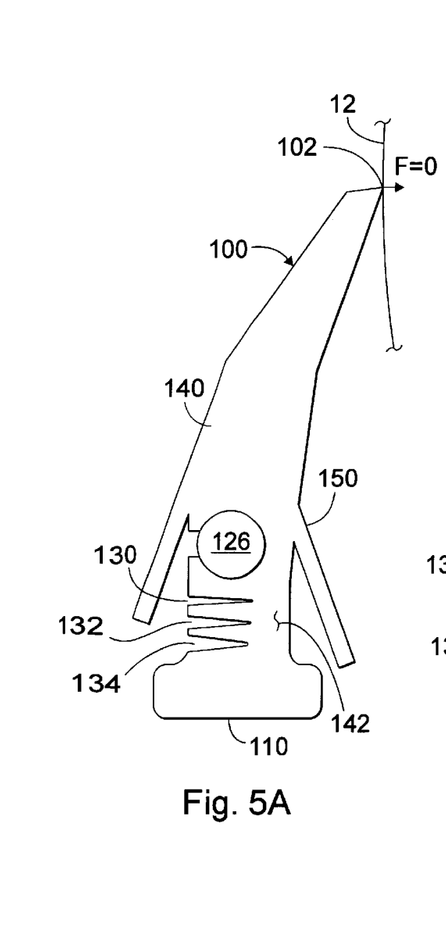
FIGS. 5A–5D are side elevations of the blade of FIG. 3 illustrating the effect of varying forces thereon.
Figures 5B, 5C, 5D:
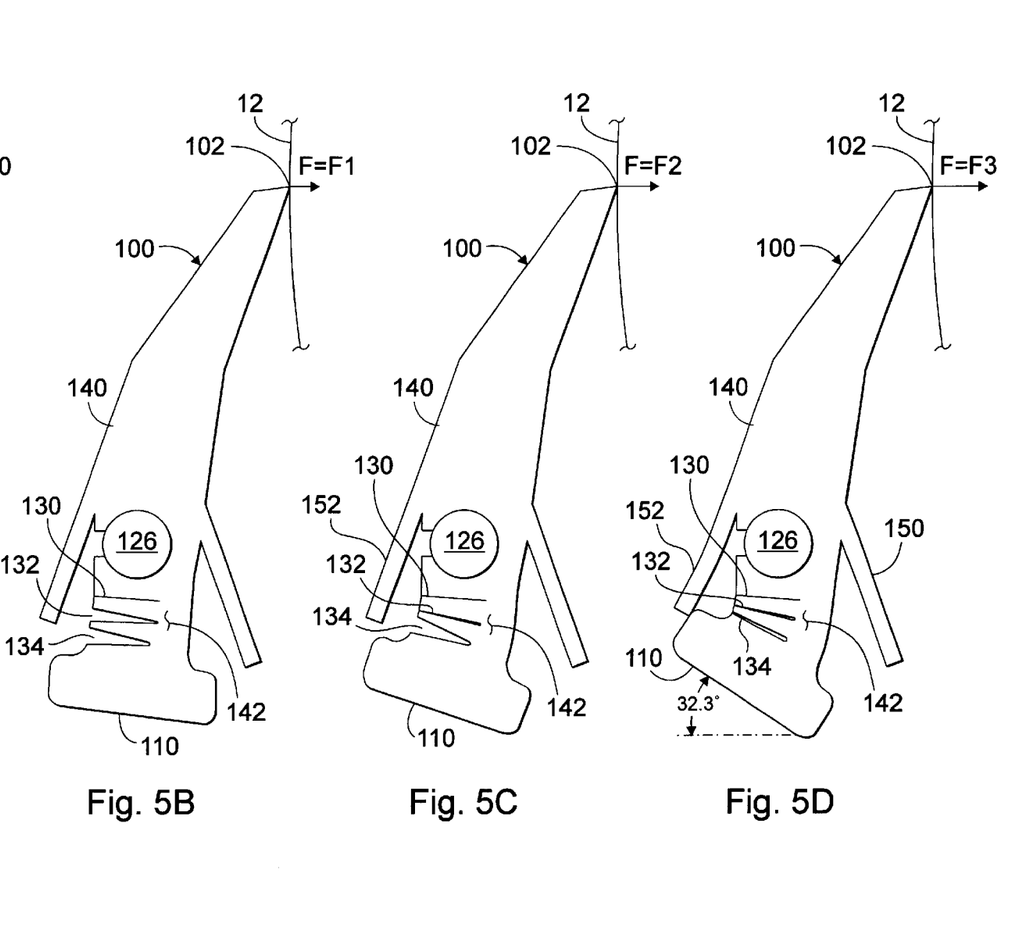
Figure 6:
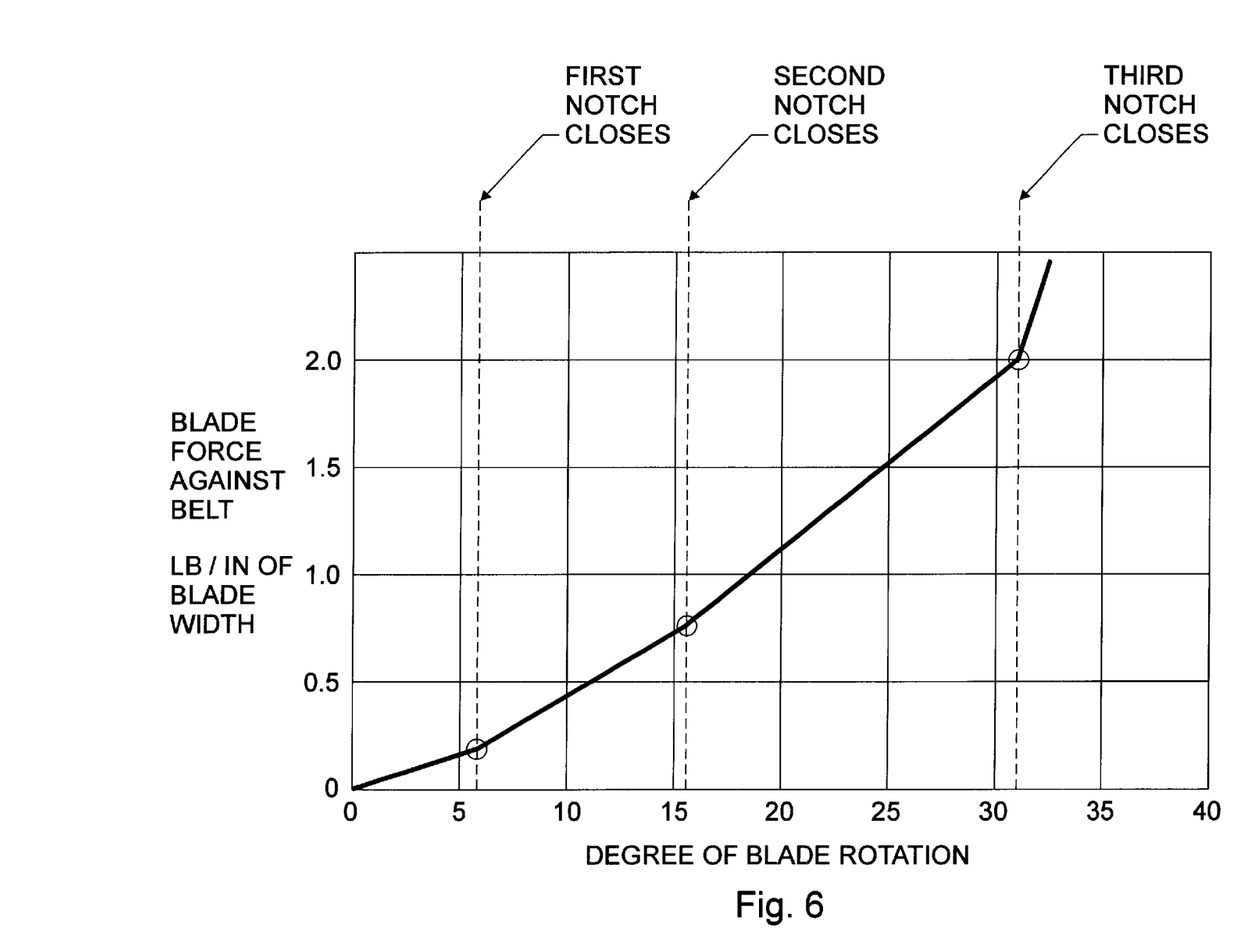
FIG. 6 is a graphical representation of the blade force as a function of the blade rotation relating to the blade positions of FIGS. 5A–5D.

In FIGS. 5A through 5D, tensioning or biasing force is applied to blade 100 by rotating blade base 110 thereof, for example, by rotating mounting tube 30. With no tensioning force applied, i.e. F=0, as illustrated in FIG. 5A, all of grooves 120, 130, 132, 134 are open and blade 100 is at rest, i.e. blade edge 102 of blade 100 rests against belt 12. In the first stage of spring action, tension region 142A flexes until groove 130 eventually closes, as illustrated in FIG. 5B, when a certain light biasing force F=F1 is applied to blade 100, as is the case when blade 100 is tensioned to press scraping edge 102 of blade 100 against conveyor belt 12, for example, using the mounting arrangement 50, 50' described above. As the tensioning force is increased further to medium force F=F2 in the second stage of spring action, groove 130 is closed and tension region 142B flexes and bends until groove 132 eventually closes, as illustrated in FIG. 5C. As the tensioning force is increased further yet to heavy force F=F3 in the third stage of spring action, grooves 130 and 132 are closed and tension region 142C flexes and bends until groove 134 eventually closes, as illustrated in FIG. 5D. This three stage progressive spring action is illustrated in the graph of FIG. 6 in which the blade 100 tensioning force F against the conveyor belt 12 (normalized per unit or inch of blade width) is plotted as a function of the number of degrees the blade base 110 is rotated with respect to the blade rest position. It is noted that the slope of the spring characteristic of FIG. 6, i.e. the spring rate or spring constant, increases in progressive fashion and the blade tensioning force increases as the blade base 110 is rotated further. Typically, blades 100 are tensioned against the conveyor belt 12 with a force between about ½ and 2½ pounds per inch of contact length between the blade edge 102 and the belt 12, and most usually between 1 and 1½ pounds per inch of contact length.

Thus, blade 100 not only provides a cleaning arrangement for conveyor system 10, but also provides the tensioning arrangement therefor without additional cost or complexity. Advantageously, blade 100 is the cleaning element, the tensioning element and the cushioning element, of belt cleaner or scraper assembly 20. In addition, grooves 130, 132, 134 also serve an indicator of the amount of tension on blade 100, i.e. the force with which blade edge 102 is biased against conveyor belt 12, thereby eliminating the need for a separate tension measuring device when tensioning blade 100.

Figure 7:
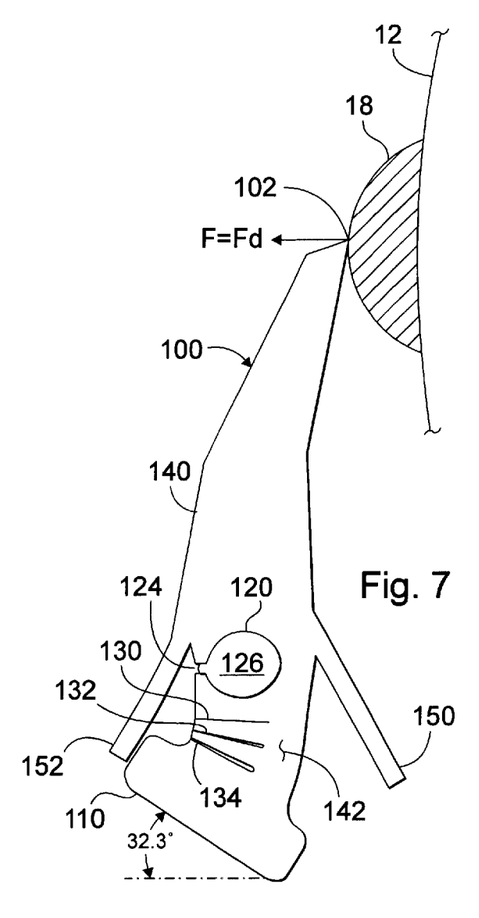
FIG. 7 is a side elevation of the blade of FIG. 3 illustrating the effect of irregularities of the belt.

When blade 100 is deflected away from conveyor belt 12 beyond the point where all of grooves 130, 132, 134 close, such as when scraper edge 102 encounters a projection 18 or other irregularity on the surface of conveyor belt 12, such as a seam, splice or patch, or hardened debris on conveyor belt 12, that causes a deflection force F=Fd, blade 100 flexes at the portion of its web 140 proximate to cushion cavity 120, thereby to deform cushion cavity 120 and cushion rod 126 therein, as illustrated in FIG. 7 by a portion of cushion rod 126 extending into slot 124 of cavity 120, to provide a cushioning effect. An advantage of the combination of grooves 130, 132, 134, cushion cavity 120 and cushion rod 126, is that blade 100 is not easily broken or chipped or worn irregularly by irregularities and other projections 18 of conveyor belt 12.

Preferably blade 100 is formed of an elastomeric polymer, such as a polyurethane or urethane, and may be cast or machined to shape. In an exemplary blade formed of about 82–85 durometer polyurethane, the distance from the blade base 110 to scraping edge 102 is about 7¹¹⁄₁₆ inches and scraping edge 102 is displaced about 2⅛ inches from the center line of blade base 110. The web 140 of blade 100 is about 1½ inches thick in tensioning region 140 and is about 1¾ inches thick above cushion cavity 120. Grooves 130, 132, and 134 are about ⅛ inch, ³⁄₁₆ inch and ¼ inch wide, respectively, and are about 1 inch, ¹⁵⁄₁₆ inch and ⅞ inch deep, respectively. Groove 120 is preferably a circular cushion cavity 122 of about 1 inch diameter and the slot 124 or gap opening thereof through the web 140 of blade 100 is about ⅜ inch wide, leaving a thickness of about ⁷⁄₁₆ inch in the tensioning region 140 thereof. Cushion rod 126 is preferably a soft plastic or rubber cushion material such as 30–40 durometer rubber, that resides in cushion cavity 120. Blade base 110 is about 2½ inches across between the faces of the opposing outwardly extending flanges 112, which are about ½ inch thick. The length of blade 100 along scraping edge 102 is about the same as the width of the conveyor belt 12 with which it is to be utilized, however, blade 100 may be slightly longer or shorter than the width of belt 12. Where blade 100 is comprised of plural blade segments 100A, a six-inch long blade segment is convenient, and depending upon the spacing of mounting tube supports 50, 50', can allow blade segments 100A to be slid out of engagement by flanges 42 of blade base extrusion 40 without removing blade base extrusion 40 from mounting tube 30, as is done to replace a unitary blade 100.

Preferably, dirt skirts 150 and 152 extend a distance sufficiently to contact the flange 112 of blade base 110 when blade 100 is fully flexed, i.e. when all of grooves 130, 132 and 134 are closed, as may be seen in FIGS. 5D and 7, for example.

Blade base extrusion 40 is metal, preferably an extrusion of aluminum or other suitable metal, but may be made by machining, forging or other suitable method. Mounting tube 30 is also metal, preferably a tube or bar of steel or other suitable metal. In mounting tube supports 50, 50', and bearing 70 are preferably a hard, slippery plastic material, such as UHMW, preferably with 100 durometer or higher. Shock mount collar 72 is preferably a rubber, urethane or other plastic cushion material, such as a cast urethane or molded rubber of 30–40 durometer, on a steel or other metal core 74 shaped to engage mounting tube 30. Spacer 76 is metal such as steel. This arrangement provides an advantage over conventional mounting arrangements in that the plastic bearing and/or cushion materials tend to stay free, and not bind or stick, in the presence of dirt and debris, particularly such materials that might tend to adhere to metal parts.

Figures 8A, 8B, 8C, 8D:
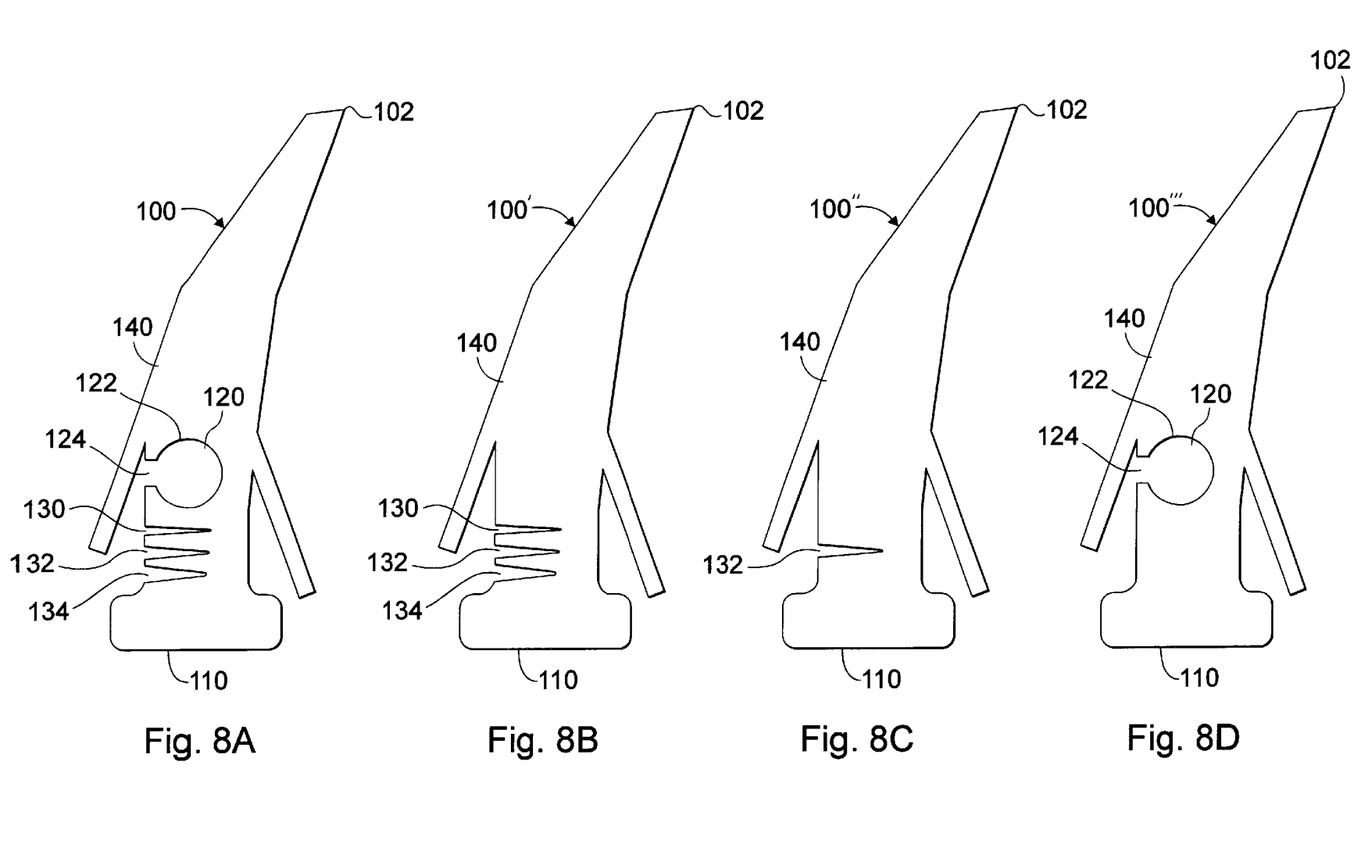
FIGS. 8A–8D are side elevations of alternative embodiments of blades useful in the belt scraper assembly of FIGS. 1 and 2.

FIGS. 8A–8D show several exemplary alternative arrangements of blade 100 in which the number and size of the grooves in blade 100 differ. FIG. 8A is the preferred arrangement of blade 100 having three grooves 130, 132, 134 of progressively differing size in combination with a circular cushion cavity 120 containing cushioning rod 126. In the exemplary alternative embodiment of FIG. 8B, blade 100' has three grooves 130, 132, 134, but no cushion cavity. In any of the embodiments, the grooves 130, 132, 134 may be progressive or different in size and/or shape, or may be of like size and shape. Further, a lesser or greater number of grooves may be employed so long as there is at least one groove defining a tension region in the web of the blade whereat the blade may flex responsive to blade tension forces. Still further, exemplary blade 100" of FIG. 8C has a single groove 130 in web 140 thereof.

Alternatively, exemplary blade 100''' of FIG. 8D has a single groove 120 that includes a cushion cavity 122 in which a cushion rod 126 is contained. Cushion cavity 122 may be of other convenient cross-section, such as oval or elliptical, or hexagonal or octagonal, for example, that will contain a cushion rod 126 of like cross-section and will allow the cushion rod to expand into the opening 124, which may be of uniform width as a slot or may be sloped or curved, to provide a cushioning effect.

While the present invention has been described in terms of the foregoing exemplary embodiments, variations within the scope and spirit of the present invention as defined by the claims following will be apparent to those skilled in the art. For example, while the blade herein is believed best suited for a primary cleaning of a belt at the head pulley, it may also be applied at a location intermediate the head and tail pulleys, or at the tail pulley, as a secondary cleaner blade In addition, grooves 130, 132, 134 may be "V" shaped or "U" shaped, or may be of other convenient shape, or a combination thereof, that define a tension region in the web 140 of the blade whereat the blade may flex responsive to blade tension forces. Further, where progressively-sized grooves are employed, the grooves do not have to be ordered progressively, i.e. from larger to smaller or from smaller to larger, but may be arranged in any order.

Further, the material of which cushion rod 126 is made may be selected to have different compression characteristics, i.e. either a harder or softer material, to obtain different stiffness of the shock absorbing element provided by cushion rod 126, without changing the size or shape of the cushion cavity 120 in which it resides. Alternatively, the size and shape of cushion cavity may be changed to obtain harder or softer cushioning.

The size of blade 100 may be increased or decreased as is convenient far a particular installation. For example, for a heavy-duty blade as might be employed with a high-speed conveyor belt, or with a wide conveyor belt or a large diameter head pulley, the height of blade 100 between blade base 110 and blade edge 102 may be greater, for example, about 14–16 inches. Further, plural blades 100 and/or blade segments 100A may be employed, and may be arranged in a substantially straight line or in a staggered or other displaced arrangement, although a straight line arrangement employing mounting elements 30, 40 50, 50' is preferred.

What is claimed is:

1. A scraping blade comprising:

a blade base;

an elastomeric blade web having a width and extending from said blade base and having a blade edge on said blade web distal said blade base;

said blade web having at least one groove therein extending the width thereof substantially parallel to said blade edge for imparting flexibility to said blade web in a region proximate the at least one groove.

2. The scraping blade of claim 1 wherein said blade base includes two opposing outwardly extending flanges adapted to engage a blade mount.

3. The scraping blade of claim 1 wherein said at least one groove is on a side of said blade web opposite the blade edge.

4. The scraping blade of claim 1 wherein said blade web has at least one additional groove therein substantially parallel to the at least one groove for imparting flexibility to said blade web in a region proximate the one additional groove.

5. The scraping blade of claim 1 wherein the at least one groove is one of a "V"-shaped groove, a "U"-shaped groove, and a circular-shaped groove with a slot-shaped opening.

6. A scraping blade comprising:

a blade base;

an elastomeric blade web extending from said blade base and having a blade edge on said blade web distal said blade base;

said blade web having at least one groove therein substantially parallel to said blade edge for imparting flexibility to said blade web in a region proximate the at least one groove, and wherein said blade web has at least one additional groove therein substantially parallel to the at least one groove for imparting flexibility to said blade web in a region proximate the one additional groove, wherein the at least one groove is larger than the one additional groove.

7. A scraping blade comprising:

a blade base;

an elastomeric blade web extending from said blade base and having a blade edge on said blade web distal said blade base;

said blade web having at least one groove therein substantially parallel to said blade edge for imparting flexibility to said blade web in a region proximate the at least one groove; and an elongated cushion element residing in the at least one groove.

8. The scraping blade of claim 7, wherein said cushion element is of softer durometer than is said blade web.

9. A scraping blade comprising:

a blade base;

an elastomeric blade web extending from said blade base and having a blade edge on said blade web distal said blade base;

said blade web having at least one groove therein substantially parallel to said blade edge for imparting flexibility to said blade web in a region proximate the at least one groove, wherein said blade web has a cushion groove substantially parallel to the at least one groove, and further comprising an elongated cushion element residing in the cushion groove.

10. The scraping blade of claim 9 wherein the cushion groove has circular cross-section with a slot-shaped opening.

11. A blade for scraping an endless belt conveyor comprising:
   a blade base adapted to engage a blade mount;
   an elastomeric blade web extending from said blade base and having a forward side and a rearward side, said forward side having a blade edge substantially parallel to said blade base and adapted for engaging an endless belt;
   said blade web having a plurality of grooves on the rearward side thereof substantially parallel to each other and to said blade base; and
   at least one skirt extending from said blade web to cover the plurality of grooves in said blade web.

12. The blade of claim 11 wherein each groove of the plurality of grooves has one of a "V"-shape, a "U"-shape, and a circular-shape with a slot-shaped opening.

13. The blade of claim 11 wherein grooves of the plurality of grooves have different sizes.

14. The blade of claim 13 wherein the sizes of the plurality of grooves are progressively larger or progressively smaller.

15. The blade of claim 11 wherein said blade web has a cushion groove substantially parallel to the plurality of grooves, and further comprising an elongated cushion element residing in the cushion groove.

16. The blade of claim 15 wherein the cushion groove is in the rearward side of said blade web and has a circular cross-section with a slot-shaped opening.

17. The scraping blade of claim 15 wherein said elongated cushion element is of softer durometer than is said blade web.

18. Apparatus for scraping a belt comprising:
   a scraping blade comprising:
      a blade base adapted to engage a blade mount;
      a blade web extending from said blade base and having a forward side and a rearward side, said forward side having a blade edge substantially parallel to said blade base for engaging the belt; and
      said blade web having a plurality of grooves on the rearward side thereof substantially parallel to each other and to said blade base for imparting flexibility to said blade web in a region proximate the plurality of grooves, wherein said blade web has a cushion groove substantially parallel to the plurality of grooves, and further comprising an elongated cushion element residing in the cushion groove; and
   a blade mount assembly comprising:
      a blade mount engaging said blade base; and
      a rotatable mount rotatably supporting said blade mount, said rotatable mount being lockable in a plurality of rotation positions for urging the blade edge of said scraping blade against the belt.

19. A scraping blade comprising:
   a blade base;
   an elastomeric blade web having a forward and a rearward side and extending from said blade base, said blade web having a blade edge on the rearward side of said blade web distal said blade base,
   said blade web having a groove therein substantially parallel to said blade edge for imparting flexibility to said blade web in a region proximate the groove; and
   at least one skirt extending from said blade web to cover the groove in said blade web.

20. A scraping blade comprising:
   a blade base;
   an elastomeric blade web having a forward and a rearward side and extending from said blade base, said blade web having a blade edge on the rearward side of said blade web distal said blade base,
   said blade web having a groove having a circular cross-section and a slot-shaped opening therein substantially parallel to said blade edge; and
   a cushioning member of softer durometer than said blade web disposed in the circular cross-section of the groove.

21. A blade for scraping an endless belt conveyor comprising:
   a blade base adapted to engage a blade mount;
   an elastomeric blade web extending from said blade base and having a forward side and a rearward side, said forward side having a blade edge substantially parallel to said blade base and adapted for engaging an endless belt;
   said blade web having at least one groove on the rearward side thereof substantially parallel to said blade base; and
   at least one skirt extending from said blade web to cover the at least one groove in said blade web.

22. A self-tensioning scraping apparatus comprising:
   a rotatable blade mount lockable in a plurality of fixed rotation positions for tensioning a scraping blade against a belt; and
   a scraping blade having a base engaging said rotatable blade mount, said scraping blade having a forward side, a rearward side and a width, the forward side having a blade edge substantially parallel to the base adapted for engaging the belt, said scraping blade having a plurality of progressively-sized grooves extending the width thereof on the rearward side thereof, wherein the plurality of progressively-sized grooves are substantially parallel to each other and to said blade edge for progressively tensioning the blade edge of said scraping blade against the belt.

23. Apparatus for scraping a belt comprising:
   a scraping blade comprising:
      a blade base adapted to engage a blade mount;
      a blade web extending from said blade base and having a forward side and a rearward side, said forward side having a blade edge substantially parallel to said blade base for engaging the belt; and
   a blade mount assembly comprising:
      a blade mount engaging said blade base; and
      a rotatable mount rotatably supporting said blade mount, said rotatable mount being lockable in a plurality of rotation positions for tensioning the blade edge of said scraping blade against the belt,
      said blade web having a plurality of progressively-sized grooves on the rearward side thereof substantially parallel to each other and to said blade base for progressively tensioning the blade edge of said scraping blade against the belt.

24. The blade of claim 23 wherein each groove of the plurality of grooves has one of a "V"-shape, a "U"-shape, and a circular-shape with a slot-shaped opening.

* * * * *